(12) United States Patent
Figueira et al.

(10) Patent No.: US 7,876,749 B1
(45) Date of Patent: Jan. 25, 2011

(54) CROSS-CONNECT USING ETHERNET MULTIPLEXORS FOR A SIMPLE METRO ETHERNET NETWORK

(75) Inventors: Norival Figueira, Campbell, CA (US); Paul Bottorff, Palo Alto, CA (US)

(73) Assignee: Nortel Networks Limited, Mississauga, Ontario (CA)

( * ) Notice: Subject to any disclaimer, the term of this patent is extended or adjusted under 35 U.S.C. 154(b) by 768 days.

(21) Appl. No.: 11/287,583

(22) Filed: Nov. 23, 2005

Related U.S. Application Data

(60) Provisional application No. 60/630,444, filed on Nov. 23, 2004.

(51) Int. Cl.
*H04L 12/28* (2006.01)

(52) U.S. Cl. ................................. 370/389; 370/535

(58) Field of Classification Search .................. 370/541, 370/542, 389, 533–540, 532
See application file for complete search history.

(56) References Cited

U.S. PATENT DOCUMENTS

| | | | |
|---|---|---|---|
| 5,107,493 A * | 4/1992 | Eng et al. .................... 370/400 |
| 6,788,681 B1 * | 9/2004 | Hurren et al. ................ 370/389 |
| 6,862,280 B1 * | 3/2005 | Bertagna ..................... 370/392 |
| 6,967,949 B2 * | 11/2005 | Davis et al. .................. 370/390 |
| 7,028,204 B2 * | 4/2006 | Jammes et al. .............. 713/400 |
| 7,154,902 B1 * | 12/2006 | Sikdar ......................... 370/412 |
| 7,349,394 B2 * | 3/2008 | Sala et al. .................... 370/392 |
| 7,372,854 B2 * | 5/2008 | Kang et al. .................. 370/390 |
| 2002/0085591 A1 * | 7/2002 | Mesh et al. .................. 370/535 |
| 2003/0108069 A1 * | 6/2003 | Yamada ....................... 370/535 |

* cited by examiner

*Primary Examiner*—Brenda Pham
(74) *Attorney, Agent, or Firm*—Robert D. McCutcheon

(57) ABSTRACT

A metro area network is provided that includes edge and core multiplexors each having a plurality of line ports and one or more uplink ports, a transport network carrying multiplexed traffic between the edge and core multiplexors. In a hard cross connect implementation utilizing source port tagging, a cross-connect device coupled to the core multiplexors provisions or maps communications path between the core multiplexors thereby providing preselected connectivity/mapping of two or more line ports of any of the edge multiplexors. In a soft cross connect implementation utilizing destination port tagging, a cross-connect device includes additional cross-connect multiplexors and functionality to control the destination port tagging performed in the edge, core and cross connect multiplexors thereby provisioning or mapping the desired communications path(s) between various endpoints.

11 Claims, 7 Drawing Sheets

CROSS-CONNECT USING ETHERNET MULTIPLEXORS FOR A SIMPLE METRO ETHERNET NETWORK

CROSS-REFERENCE TO RELATED APPLICATION

This application claims priority under 35 U.S.C. 119(e) to U.S. Provisional Application Ser. No. 60/630,444, filed on Nov. 23, 2004, and which is incorporated herein by reference.

TECHNICAL FIELD

1. Technical Field

The present invention relates generally to communication systems and networks, and more particularly to a system, architecture, apparatus and method for a cross-connect (switching/mapping function) using multiplexors for a metro network.

2. Background

Due to unsurpassed benefits in terms of simplicity, flexibility, and low cost, Ethernet is today the most widely adopted networking technology in the world. Ethernet is unquestionably today's universal Enterprise LAN technology and is now economically and technically feasible for evolution into the Metro Access Network (MAN). Service providers today can run Ethernet equally well over their existing transport infrastructures or natively on fiber. This capability is motivating service providers to introduce metro Ethernet services over simple Ethernet interfaces.

Current important metro Ethernet services include the Ethernet Line Service (ELINE) and the Ethernet LAN Service (ELAN). ELINE provides point-to-point connectivity with dedicated bandwidth and security. ELAN provides multi-point-to-multipoint connectivity and is similar to legacy transparent LAN services. ELINE is an alternative to private communications line service using T1s or Frame Relay physical virtual connections (PVCs).

Such metro Ethernet services provide significant benefits over traditional metro data services in terms of service scalability (e.g., service can scale from 1 Mbps or less to 1 Gbps in small fixed increments), economical scalability (e.g., enterprise attachment requires low-cost Ethernet port on a layer 2/3 switch), lower support costs (e.g., reduced enterprise engineering and operational support costs by utilizing the same Ethernet technology as familiar LAN Ethernet deployments), and faster service provisioning using software-provisioned bandwidth-on-demand.

Different alternative metro Ethernet network (MEN) core architectures currently exist and/or are being developed in the industry, such as Resilient Packet Ring (RPR), Virtual Private LAN Services (VPLS)/Psuedo Wires (PW)/Multiprotocol Label Switching (MPLS), and NextGen-SONET. However, these architectures are relatively complex in design, operation, and management.

Accordingly, there exists a need for a simpler core design and less complicated architecture that provides significant benefits over current industry directions in terms of reduced operation and maintenance cost, reduced capital cost, service level agreement (SLA) assurance, reliability, scalability to large customer populations, and support for ELINE, ELAN, and future services.

SUMMARY

In another embodiment, accordance with one embodiment of the present invention, there is provided a switching device operable in a packet-based network. The switching device includes a first multiplexor having an uplink port and a plurality of line ports, the first multiplexor operable for receiving data packets at the plurality of line ports of the first multiplexor, tagging the received data packets with an identifier uniquely identifying the line port receiving the data packet, multiplexing the tagged and received data packets into multiplexed data, and transmitting the multiplexed data on the uplink port. A second multiplexor is provided having an uplink port and a plurality of line ports, the second multiplexor operable for receiving data packets at the plurality of line ports of the second multiplexor, tagging the received data packets with an identifier uniquely identifying the line port receiving the data packet, multiplexing the tagged and received data packets into multiplexed data, and transmitting the multiplexed data on the uplink port of the second multiplexor. A cross connect device is further provided having a first terminal connected to a first one of the plurality of line ports of the first multiplexor and a second terminal connected to a first one of the plurality of line ports of the second multiplexor, thereby providing a communications path between the first line port of the first multiplexor and the first line port of the second multiplexor.

In another embodiment, there is provided a method of communicating data packets over a LAN-based network. The method includes receiving a first data packet from a first endpoint device at a first port of a first multiplexor, and tagging the received first data packet with a first identifier uniquely identifying the first port of the first device from other ports of the first device. The tagged data packet is multiplexed with other tagged data packets received at other ports of the first device to generate multiplexed data and outputting the multiplexed data at a first uplink port of the first device and transporting the multiplexed data over a communications channel to an uplink port of a second device. The multiplexed data received via the uplink port is demultiplexed to recover the first tagged data packet and the other tagged data packets. The first identifier is removed from the first tagged data packet and transmitting the first data packet out a second port of the second device, the first identifier operable for uniquely identifying the second port from other ports of the second device multiplexor.

In yet another embodiment, there is provided a metro area communications network having a plurality of edge multiplexors, each edge multiplexor having a plurality of line ports operable for coupling to a plurality of end devices and an uplink port. A transport network is coupled to each of the uplink ports and operable for carrying data packets generated by the plurality of end devices. The network includes a plurality of core multiplexors having a one-to-one correspondence with the plurality of edge multiplexors, each core multiplexor having a plurality of line ports and an uplink port, the uplink port coupled to the transport network. A cross connect device is coupled to at least a first port and a second port of the plurality of ports of the core multiplexors providing a communications path between the first port and the second port thereby providing a point to point link between a first port and a second port of the plurality of ports of the edge multiplexors.

In still another embodiment of the present invention, there is provided a method of configuring communication links between two or more endpoints in a network, the network including a plurality of edge multiplexors each communicatively coupled to a corresponding plurality of core multiplexors, and a plurality of cross-connect multiplexors communicatively coupled to the plurality of core multiplexors. The method includes receiving a request to configure a communications path between a first endpoint and a second endpoint, selecting and identifying an available link between a first one of the plurality of cross connect multiplexors and a first one of the plurality of core multiplexors, transmitting programming information to a first edge multiplexor corresponding to the first endpoint, the programming information operable for instructing the first edge multiplexor to tag frames received from the first endpoint with an identifier identifying a first attribute of the selected available link, transmitting programming information to the cross connect multiplexor, the programming information operable for instructing the cross connect multiplexor to tag frames received via the first edge multiplexor with an identifier identifying a second attribute of the selected available link, and transmitting programming information to a first one of the plurality of core multiplexors corresponding to the second endpoint, the programming information operable for instructing the first core multiplexor to tag frames received from the cross connect multiplexor with an identifier identifying an attribute of the second endpoint.

Other technical features may be readily apparent to one skilled in the art from the following figures, descriptions, and claims.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

Figure 1:
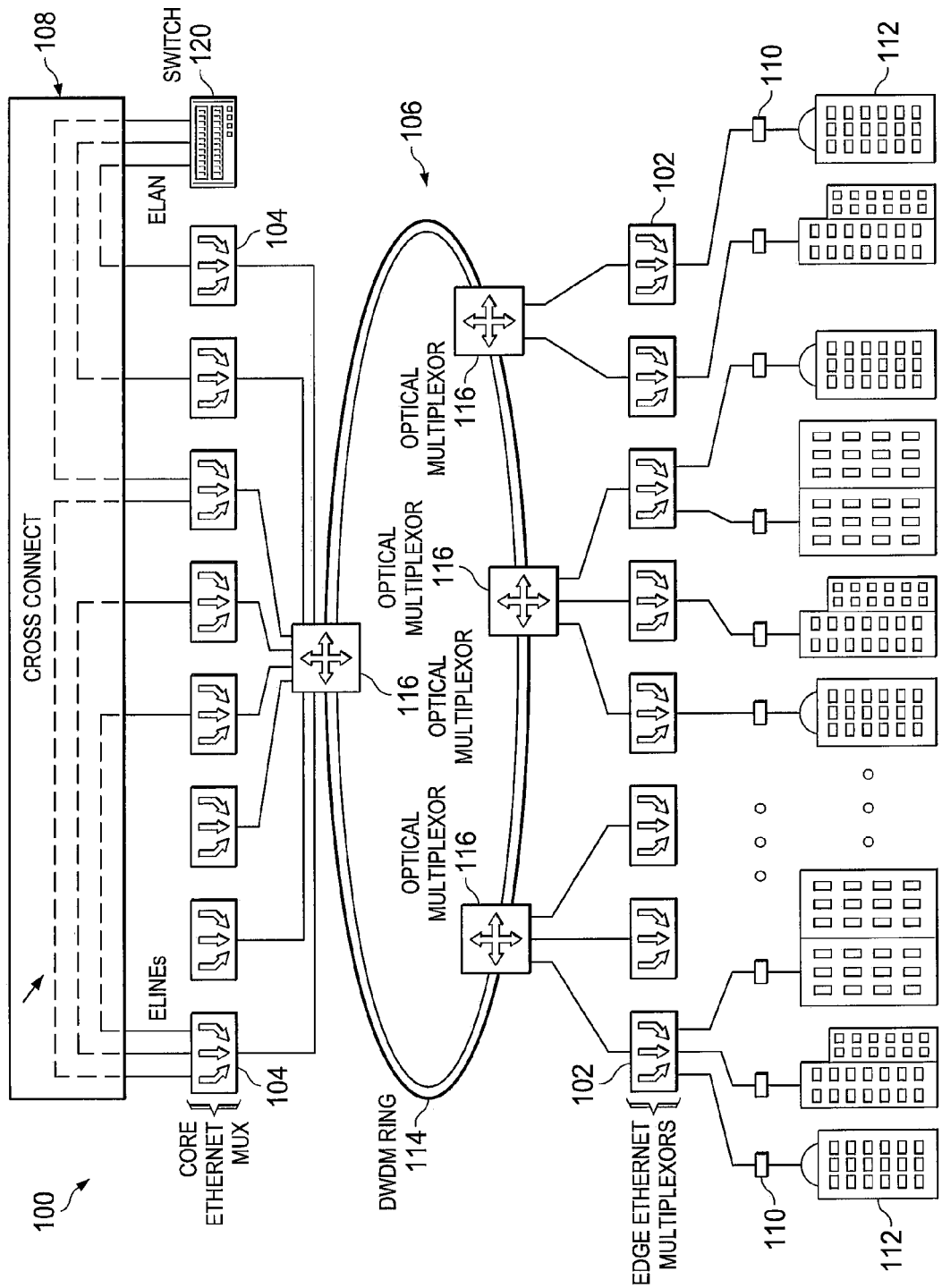
FIG. 1 illustrates an example communications network illustrating the metro network architecture of the present invention.

FIG. 1 illustrates an example communications network system 100 for an Ethernet-based metro area network. The system or network 100 shown in FIG. 1 is for illustration purposes only. Other embodiments of the network 100 may be used without departing from the scope of this disclosure.

In this example, the network 100 includes a plurality of edge multiplexors 102 and a plurality of core multiplexors 104 interconnected and communicatively coupled via a backbone transport network 106 and a cross-connect apparatus or means 108 (providing switching functions, including provisioning for ELINE, ELAN services).

The network 100 may be implemented in different embodiments. In one main implementation, as more fully described below and referred to hereinafter as the "hard" cross connect implementation, the cross connect 108 is described as a device or means where the cross-connect (mapping, switching) functionality is found within the cross-connect (i.e. within the solid reference lines denoting element 108). In this hard cross connect implementation, each edge multiplexor 102 has a corresponding core multiplexor 104, in one-to-one correspondence, within the network 100. This one-to-one correspondence provides a point-to-point link between the respective edge and core multiplexor pair. In addition, each line port of a pair of corresponding edge and core multiplexors has a one-to-one correspondence (e.g., line Port "X" of the edge multiplexor is linked with the same line Port "X" of the core multiplexor) and provides a point-to-point link between respective (and aligned) line port pairs.

Also in this hard cross connect implementation scheme, the cross-connect device 108 may be implemented through manual hardwire provisioning (e.g., physical connections, such as cabling, are made between the line ports of the core multiplexors 104, as desired). Software or programming provisioning may be utilized alone or in conjunction with cross-connect hardware within the cross-connect 108 whereby mapping/configuration of connection paths under software or programmable control is utilized. In other embodiments, any combination of hardwire, hardware and software provisioning for the components within the cross-connect 108 may be used. In the hard cross connect implementation, the cross connect 108 provides a desired communication path between two line ports of the core multiplexors 104 by means as described above.

The edge and core multiplexors 102, 104 in the hard cross-connect implementation engage in source port tagging of received data packets, as more fully described below. No additional programmability or control over the edge and core multiplexors 102, 104 with respect to port tagging or addressing in this configuration is necessary, as the cross-connect 108 provides relevant mapping to connect source and destination endpoints.

In another main implementation, as more fully described below and referred to hereinafter as the "soft" cross connect implementation, the cross connect 108 is described logically with respect to FIG. 1 (functionality is provided by hardware elements and management/programmability of the edge and core multiplexors 102, 104). The solid lines reference lines denoting element 108 may be described more aptly using dotted lines that include therein the control/programmable aspects of the edge and core multiplexors 102, 104. Additional multiplexors, identified as "cross-connect" multiplexors, and a controller are included in the cross connect 108 in the "soft" cross connect implementation (more fully described later).

In the soft cross connect implementation, each multiplexor 102 has a corresponding core multiplexor 104, in one-to-one correspondence, within the network 100. This one-to-one correspondence provides a point-to-point link between the respective edge and core multiplexor pair. Unlike the hard cross connect implementation, this embodiment may function without one-to-one line port alignment. In general, the edge, core and cross-connect multiplexors (shown in FIGS. 3 and 4) utilize destination port tagging of received data packets, as more fully described below, in the soft cross connect implementation, while source port tagging is performed with the hard cross connect implementation.

Each of the hard and soft cross connect embodiments and its respective operation is more fully described below with reference to FIGS. 1 and 3 and FIGS. 1, 4 and 5, respectively.

Now referring back to FIG. 1, each edge multiplexor 102 has a corresponding core multiplexor 104, in one-to-one correspondence, within the network 100. Coupled to the edge multiplexors 102 are a number of line interface devices or demarcation devices 110. The devices 110 represent, in one embodiment, the "edge" of a service provider network or the edge of the network 100. Various customer or subscriber "endpoints" or sites 112 are shown coupled or attached to the demarcation devices 110. Typically, customers or subscribers couple to the demarcation devices 110, which in turn, couple/ interface to line ports of the edge multiplexors 102. The demarcation devices 110 provide an interface between the customer (site) and the network 100, and may simply be an electrical connection or include additional interfacing components or capability.

In one embodiment, the network 106 comprises a fiber communications ring utilizing, for example, a dense wave division multiplexing (DWDM) architecture using fiber communication lines 114 and one or more optical multiplexors 116. Though network 106 is illustrated as a communications "ring", other network topologies (and devices) may be utilized or suitable.

In general operation, traffic generated by the endpoints 112 is received via the demarcation devices 110 at the edge multiplexors 102 and multiplexed. The multiplexed traffic is carried over the DWDM network ring 106 (further multiplexed by the upstream optical multiplexor(s) 116 and demultiplexed by the downstream optical multiplexor(s) 116) and demultiplexed at the appropriate core multiplexor 104 and passed to the physical connections of the cross connect 108. The cross-connect device 108 provisions various switching/mapping/configuration functions as desired, such as ELINE, ELAN, etc., to provide one or more communications paths between line ports of the core multiplexors 104—using either a hard or soft cross connect implementation.

Different approaches, architectures and protocols may be utilized in conjunction with the network 106, such as electrical-optical-electrical (EOE) and optical-optical (OO) configurations. Utilization of the OO configuration may be the most cost effective approach by using different wavelengths generated from the different multiplexors 102, 104. In this configuration, each multiplexor directly generates and sources the required distinct DWDM wavelength for the carrier light signal. This reduces or eliminates the need for wavelength shifts in the optical multiplexors 116, thereby reducing equipment cost. For wavelength selection, the multiplexor may utilize pluggable transceiver modules. As such, the multiplexors operable with pluggable 10GE transceiver modules are suitable for this application.

As used herein, the term multiplexor refers to a device that includes multiplexing functionality, and may additionally include de-multiplexing functionality. Further, when operating in accordance with Ethernet, the multiplexors may be referred to as "Ethernet multiplexors."

The edge multiplexor 102 provides the following basic functions: (1) attachment for customer lines via demarcation devices 110; (2) multiplexing of customer lines (i.e., data packets) into the metro optical backbone ring network 106; and (3) de-multiplexing customer lines (i.e., data packets) from the metro optical backbone ring network 106 for customer attachment via demarcation devices 110.

A core multiplexor provides the following basic functions: (1) de-multiplexing customer lines (i.e., data packets) from the metro optical backbone ring network 106 for cross-connect device 108 (providing switching and/or provisioning of services); and (2) multiplexing lines from the cross-connect device 108 (providing switching and/or provisioning of services) into the metro optical backbone ring network 106.

Figure 2:
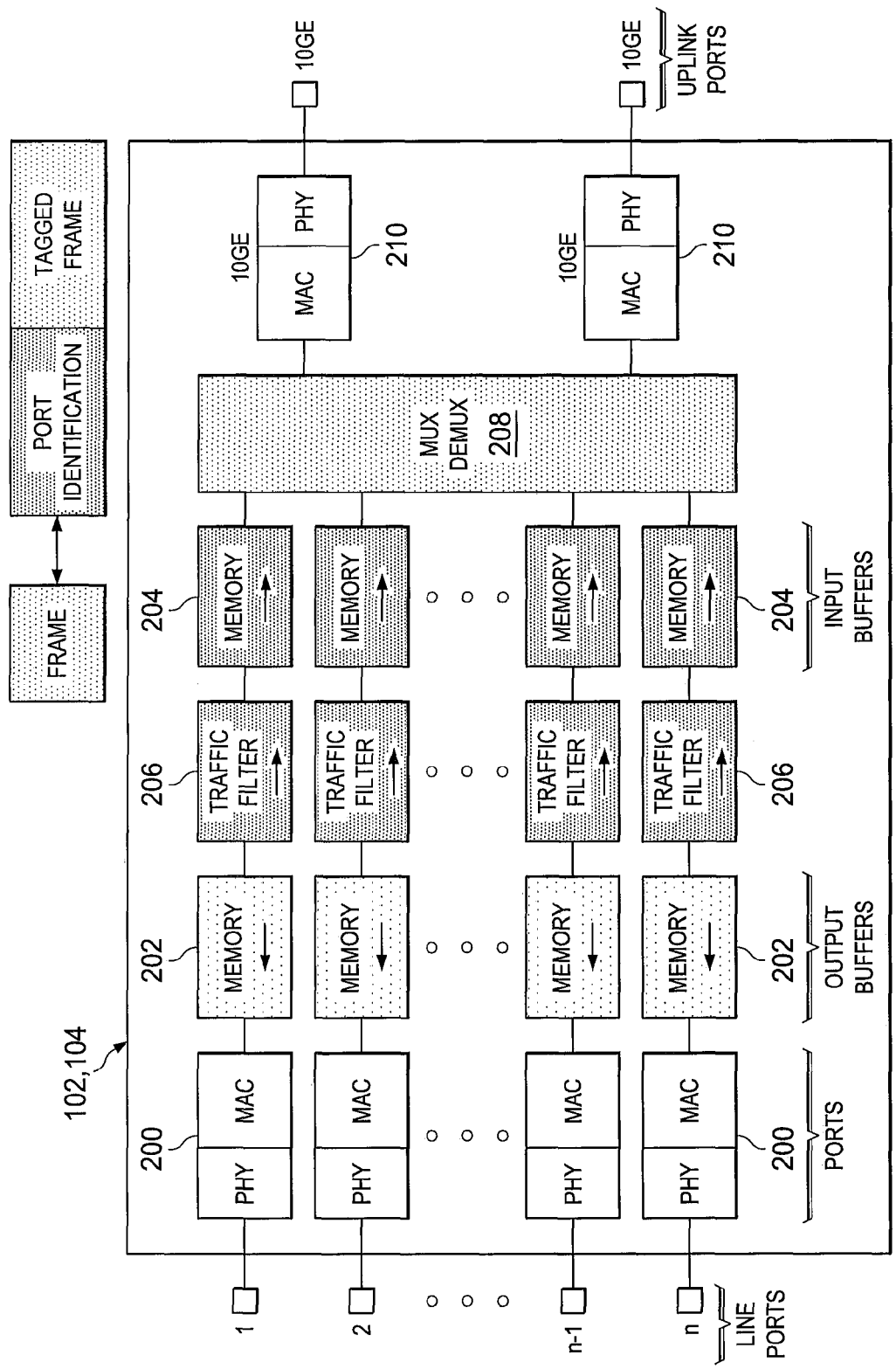
FIG. 2 is a block diagram of a multiplexor in accordance with the present invention.

Now referring to FIG. 2, there is illustrated a basic block diagram of a multiplexor 102, 104. The multiplexor 102, 104 includes n number of line ports and one or more uplink ports. Each line port is associated with an identifier (e.g., a number) that is unique for the multiplexor 102, 104. Any number and configuration of line ports and uplink ports may be utilized as desired, and depending on the bandwidth(s) selected. In one example configuration, up to ninety-six (96) horizontal 10/100/1000 Mbps Ethernet links are multiplexed or mapped to a single 10 Gigabit Ethernet (GE) uplink port. Various combinations in the number and type of line ports are possible depending on the bandwidths of the line ports and uplink port(s). Optionally, one or more redundant uplink ports may be utilized. In a simple specific embodiment, a multiplexor may include ten 1 GE line ports and two 10GE uplink ports (one 10 GE uplink port for fault tolerant and redundancy purposes).

Line ports of the edge multiplexors 102 interface with endpoints or lines (i.e., demarcation devices, sites or customers, etc.) while the uplink ports interface with the DWDM ring network 106. Uplink port(s) of the core multiplexors 104 interface with the DWDM ring network 106 while the line ports interface with the cross-connect device 108. The cross-connect device 108 provides one or more selected or predetermined separate communications paths, each communication path coupling at least two line ports of one or more core multiplexors 104.

The multiplexors 102, 104 of the present invention multi-plex data packets (e.g., frames, data packets or signals, etc.) of one or more channels having a lower bandwidth into data packets on one or more channels having a higher bandwidth (and demultiplex such higher bandwidth channels into lower bandwidth channels).

In general, and though dependent on the implementation method (i.e., hard or soft cross connect implementation), in an uplink direction from an edge/core multiplexor 102,104 to a core/edge multiplexor 104, 102, all frames received at a line port (ingress port) are tagged with a unique tag identifier (port identifier (id) or other tag identifier) uniquely identifying a given destination (egress) port of an upstream multiplexor, and transmitted out an uplink port. To identify this destination (egress) port, the frames are tagged with the source (or receiving) line port's identifier utilizing source port tagging in the hard cross connect implementation. Alternatively, the frames are tagged with a predetermined destination port identifier utilizing destination port tagging in the soft cross connect implementation. In either frame tagging scheme, the tag identifier identifies the egress port of the upstream multiplexor (or next hop). As will be appreciated, source port tagging requires the same aligned port of the upstream multiplexor to be the egress port.

Tagging may be accomplished in any suitable manner, including the use of stacked VLANs (similar to approach in IEEE 802.1ad Provider Bridges), Martini encapsulation, MAC in MAC encapsulation (Ethernet frame encapsulated with another Ethernet frame), identifier embedded in the Ethernet preamble, or others known to those skilled in the art.

Similarly, in the downlink direction from a core multiplexor 104 to the cross connect 108 (or from an edge multiplexor 102 to the demarcation device 110), when a frame is received at an uplink port, the frame is a tagged frame and includes a tag identifier (previously inserted therein from an upstream component). The tag identifier is removed from the received frame and the frame is forwarded to the appropriate line port that matches the removed tag identifier.

The multiplexors 102, 104 illustrated in FIG. 2 include physical layer and MAC layer components or line interfaces 200 (in hardware/software form), output buffers 202, input buffers 204 and traffic filters 206 for each line port 1 thru n. Thee line port interfaces 200 may be configured to utilize Ethernet First Mile (EFM) [point-to-point, Passive Optical Networks (PON), or copper] or 10/100/1000BASE-T. The uplink port(s) include physical layer and MAC layer components or line interfaces 210 (in hardware/software form) that may utilize 1 GE, 10GE, or 2.5 to 10G Generic Framing Procedure (GFP).

The multiplexors 102, 104 further include a multiplexor/de-multiplexor circuit 208 that provides the functionality described herein. The circuit 208 may be implemented in hardware, software or combination thereof. In one embodiment, the mux/demux circuit 208 implements a DRR (Deficit Round Robin) scheduling algorithm in order to guarantee each line port's specified data rate. Other methods and algorithms may be utilized for multiplexing and/or to provide fair and balanced allocation of the bandwidth through suitable load balancing and/or multiplexing schemes. Traffic filters 206 provide traffic filtering capabilities, such as filtering/dropping out-of-profile frames. Further detailed description of the components of the multiplexors 102,104, except as described herein, is not necessary to understand the present invention, and these components and their functionality are readily understood and well-known to those skilled in the art.

Additionally, the multiplexors 102, 104 may include capabilities and functionality such as low traffic blocking ratio, redundant components for reliability and traffic metering or filtering for service level agreement (SLA) enforcement. The multiplexors 102, 104 of the present invention are capable of protocol independent operation, since each relies on its own added tag (source or destination port tagging) to forward frames.

Referring back to FIG. 1, the cross connect 108 provides a switching/connection function to the line ports of the core multiplexors 104. As shown in dotted lines within the device 108, an ELINE is provisioned or created by connecting two line ports of a same or different core multiplexor 104. Similarly, an ELAN is provisioned or created by connecting three or more line ports from the same or different core multiplexors 104 to a switch 120 (thus providing the multipoint to multipoint connectivity). The same or additional switches 120 may be used to provision additional ELANS. Though illustrated external to the cross connect device 108, the switch 120 may be included physically or logically within, or as part of, the cross connect device 108.

As described above, the cross connect device 108 may be implemented in different configurations—as a "hard" cross connect or "soft" cross connect. A hard cross connect implements these connections (the dotted line connections) with actual physical "wires" with little or no circuitry included therein, but may include cross-connect switch functionality that may be software or programmable provisioned or controlled. This allows for on-demand manual provisioning. In contrast, a soft cross connect uses additional multiplexor technology and programmability of edge, core and cross-connect multiplexors to implement point-to-point connections. This allows for on-demand software provisioning. In essence, the soft cross-connect is a combination of functional hardware (multiplexors), wires and software/management functionality to control the edge, core and cross connect multiplexors, and though physical wire connections are utilized, the ELINES and ELANS (i.e., connections) are, in essence, programmably mapped or provisioned.

Figure 3:
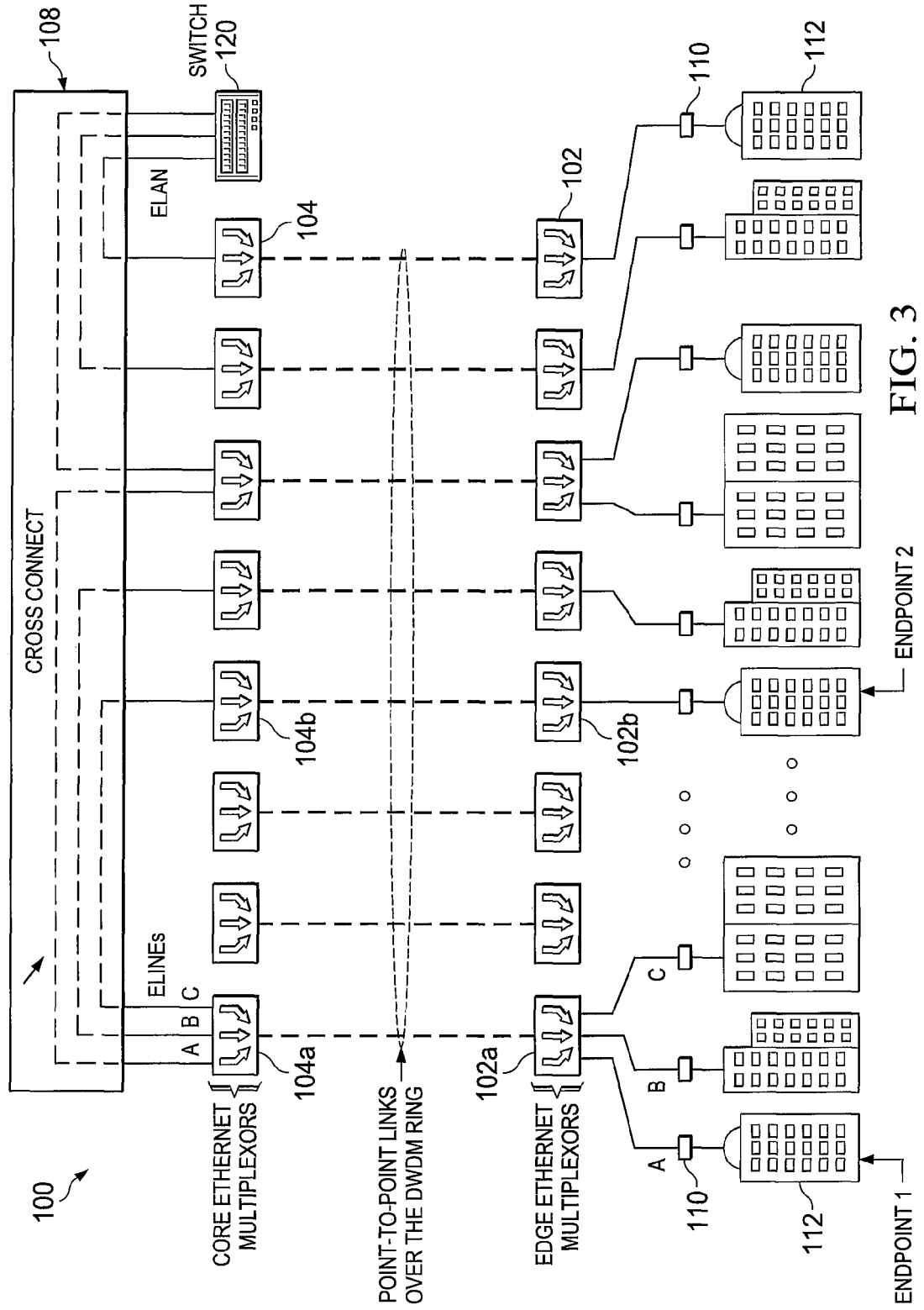
FIG. 3 illustrates one embodiment of the network shown in FIG. 1.

Now referring to FIG. 3 (with reference to FIG. 1 as necessary), a more detailed operation of the network 100 in the hard cross connect embodiment will now be described. Each edge multiplexor 102 forwards the traffic from all customer line ports to an uplink port towards its respective optical multiplexor 116. The traffic of each edge multiplexor 102 is carried over the ring network 106 using a DWDM (using EOE or OO techniques, as described above) or some other suitable technique. As illustrated in FIG. 3, the DWDM ring network 106 provides point-to-point links between each edge multiplexor 102 and a corresponding core multiplexor 104.

Each core multiplexor 104 de-multiplexes the traffic received from its associated edge multiplexor 102. Each core multiplexor 104 operates as a "mirror" of its associated edge multiplexor 102—one-to-one multiplexor correspondence and one-to-one line port correspondence. For example, the ingress traffic of a customer on line port A (and ports B, C) of edge multiplexor 102a will egress at the equivalent line port A (and ports B, C) of the associated core multiplexor 104a. Similarly, an edge multiplexor 102 de-multiplexes the traffic received from its associated core multiplexor 104, thus also operating as a "mirror" of the core multiplexor 104. As a result, there exist one or more (depending on the number of line ports of the associated multiplexor pair) point-to-point (e.g., line Port A to line Port A, Port B to Port B, etc.) links over the network 106.

Figure 4:
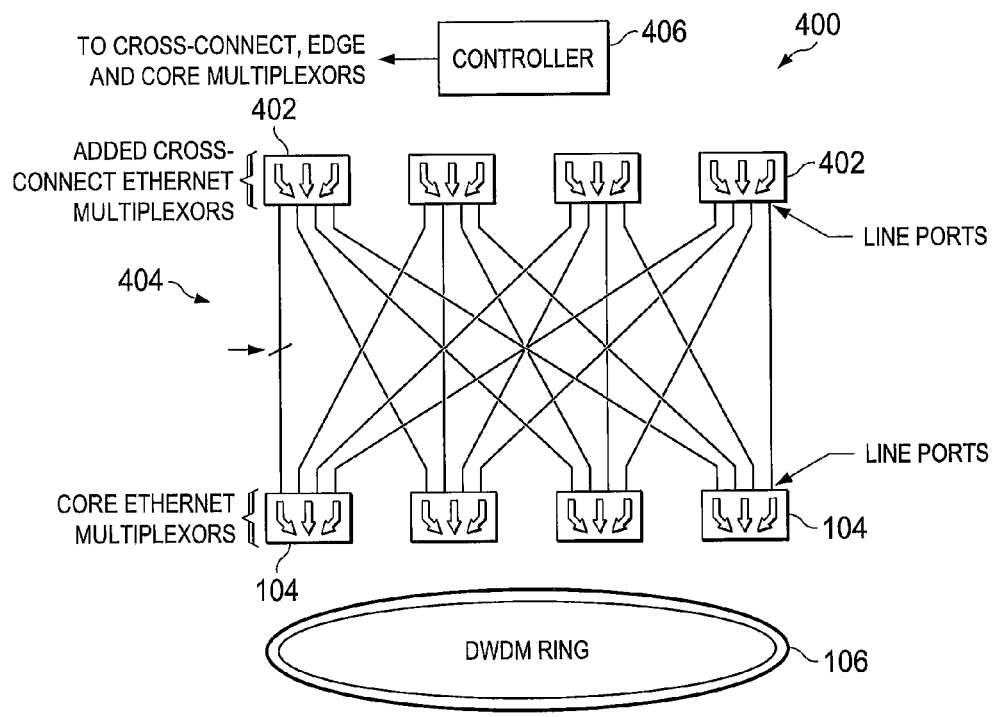
FIG. 4 is a block diagram of main components of a another embodiment of the network.
Figure 5:
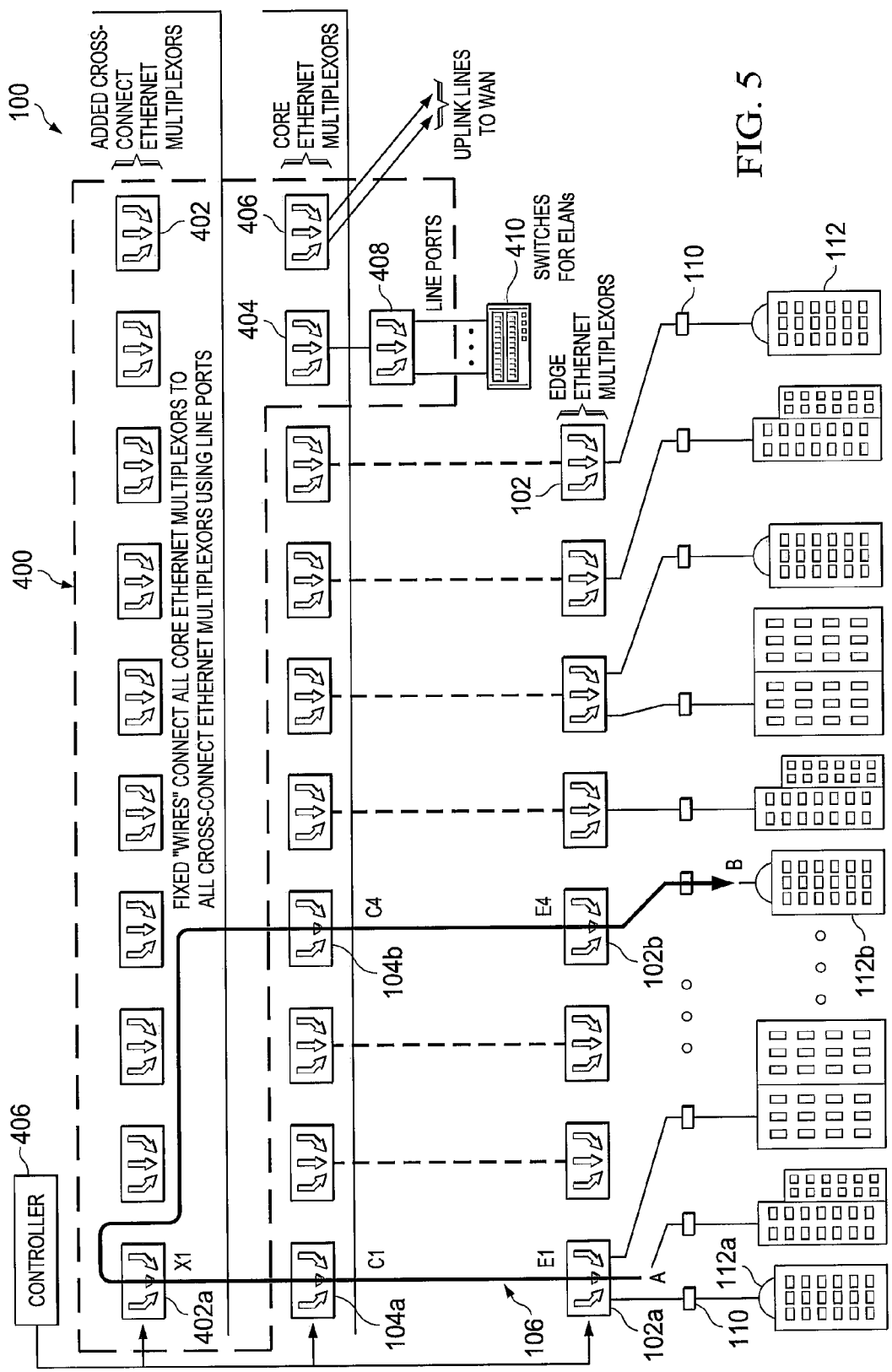
FIG. 5 is a more detailed diagram illustrating the other embodiment of the network (partially shown in FIG. 4)

In contrast, in the soft cross-connect embodiment, more fully described with respect to FIGS. 4 and 5, the configuration of point-to-point paths is done dynamically on demand and by management software. The soft cross-connect 108 configures the multiplexors 102, 104 (and any included cross connect multiplexors) to use destination port identifier tagging (as more fully described below). With destination port identifier tagging, destination tag identifiers are manipulated to change destination ports. Therefore, the edge and core multiplexors 102, 104 do not necessarily work as mirrors.

Again referring to FIG. 3, there is illustrated three ELINEs and a single ELAN provisioned or created by the cross-connections of core multiplexors 104. More than one ELAN can be hosted by a same switch when stacked VLANs are utilized and the VLAN IDs of ELANs sharing the same switch are distinct. Other methods or techniques may be employed.

Multiplexors 102, 104 may include more than one uplink port to allow for failure recovery, increased uplink capacity, or both. For example, with two uplink ports per multiplexor 102, 104, two uplink point-to-point links (each with a plurality of port links thereon) may be provided between edge and core multiplexors. Therefore, capacity is doubled and the network 100 may tolerate one point-to-point link failure (i.e., due to port failure or a fiber cut) per associated edge and core multiplexors. Also contemplated are the implementation of protection schemes where a point-to-point link is active while the other one is in standby. This maintains the capacity of the individual uplink or overall network 100 during a failure condition.

When using two uplink ports per multiplexor 102, 104, the DWDM ring network 106 may utilize two physically separate fiber rings using different physical paths to improve resilience. Using two fiber rings also reduces the number of required distinct wavelengths. However, the number of point-to-point links supported by a fiber ring can also be doubled by using the same wavelengths clockwise and counter-clockwise. These principles may be utilized in both hard or soft cross connect embodiments.

Again referring to FIG. 3, a specific example of the operation of the network 100 (in the hard cross connect implementation) will now be described where a given customer desires LAN connectivity between endpoint 1 (or site) and endpoint 2 (or site), as shown. Endpoint 1 is coupled to a first line port of the edge multiplexor 102a (identified hereafter as Port 2) while endpoint 2 is coupled to a first line port of the edge multiplexor 102b (identified hereafter as Port 7). An Ethernet frame generated at endpoint 1 is received at Port 2 and the edge multiplexor 102a tags the frame with an identifier identifying Port 2. The tagged frame is multiplexed with frames received on other line ports of the multiplexor 102*a* and transmitted using one or more higher bandwidth channels over the DWDM network (which appropriately distinguishes the multiplexed frames of one edge multiplexor 102 from another).

The multiplexed frames (or signals) are received at a corresponding core multiplexor 104*a* (via a channel on the network 106 between the edge and core multiplexors 102*a*, 104*a*). In the embodiment shown, each edge multiplexor 102 has a corresponding core multiplexor 104 with one-to-one correspondence. Upon receipt, the multiplexed frames (or signals) are demultiplexed to recover the individual tagged frame (tagged with line Port 2 identifier). The core multiplexor 104*a* strips the tag and transmits this frame to its corresponding line Port 2 for transmission to the cross-connect 108.

The cross-connect device 108, through manual hardwire provisioning, software provisioning or combination thereof, provides a communication path between line Port 2 of core multiplexor 104*a* and line Port 7 of core multiplexor 104*b*. Thus, the Ethernet frame output Port 2 is input and received at Port 7 of the core multiplexor 104*b*.

This received frame is tagged by the core multiplexor 104*b* with an identifier identifying Port 7. The tagged frame is multiplexed with frames received on other line ports of the core multiplexor 104*b* and transmitted using one or more higher bandwidth channels over the DWDM network (which appropriately distinguishes the multiplexed frames of one core multiplexor 104 from another).

The multiplexed frames (or signals) are received at the corresponding edge multiplexor 102*b* (via a channel on the network 106 between the edge and core multiplexors 102*b*, 104*b*). Upon receipt, the multiplexed frames (or signals) are demultiplexed to recover the individual tagged frame (tagged with line Port 7 identifier). The edge multiplexor 102*b* strips the tag and transmits this frame to its corresponding line Port 7 for transmission on the line coupled to endpoint 2.

Now referring to FIGS. 4 and 5, illustrated is the soft cross connect implementation of the network 100 in accordance with the present invention. FIG. 4 depicts the main components of a soft cross-connect 400 constructed or implemented using a plurality of multiplexors 402 with various interconnections 404 to the core multiplexors 104 and a controller 406. As noted previously, the cross connect 400 is, in essence, an element combining various hardware components, such as cross connect multiplexors 404 and electrical connections/wiring, and controlling software for managing the edge and core multiplexors 102,104.

The multiplexors 402 are the same or similar devices as the multiplexors 102, 104 described above. The soft cross connect 400 of the present invention leverages the same basic technology as described in the hard cross connect implementation of the network 100. In this soft cross connect configuration, the multiplexors 102, 104, 402 implement destination port identifier tagging, as referenced above. The configuration of the point-to-point paths may be done dynamically on demand and by software. As described, the soft cross-connect 400 provides N+N or N+1 protected point-to-point cross-connect paths without requiring any additional hardware.

The soft cross-connect 400 is implemented using the row of cross-connect multiplexors 402 statically connected to the line ports of the core multiplexors 104, as shown. In a specific embodiment (four core and four cross-connect multiplexors), each of the multiplexors 104, 402 may have up to (96) line ports, which allow each core multiplexor 104 to have twenty-four (24) line port connections to each cross-connect multiplexor 402. In one embodiment, each of the core multiplexors 104 are similarly or equally connected to all of the cross-connect multiplexors 402, and may be configured in a one-to-one correspondence where the number of cross-connect multiplexors 402 equals the number of core multiplexors 104. In other embodiments, cross connect multiplexors 402 may number fewer or more than the number of core multiplexors 104.

The controller 406 is implemented by a processor, computer or other suitable device. The controller 406 is communicatively coupled to the edge, core and cross-connect multiplexors 102, 104, 402 via the ring network 106, separate communications line(s) or network (private or public network, such as IP or ATM network), or combination thereof. The controller 406 operates to select certain available links (between multiplexors) to configure a communications path between two or more endpoints by controlling destination port tagging performed by the edge, core and/or cross-connect multiplexors. The controller 406 may include any hardware, software or combination thereof suitable to implement this functionality. In one embodiment, the controller transmits Simple Network Management Protocol (SNMP) messages to the multiplexors for programming the destination port tagging.

Now turning to FIG. 5, there is illustrated an overall diagram of one embodiment of the network 100 implementing a soft cross connect. Illustrated in FIG. 5 and described below is general example of a point-to-point connection established using the soft cross connect 400. In this example, a point-to-point connection is desired to be established between customer (or endpoint) A (112*a*) and customer B (112*b*). Only the actions taken on the path from A to B will be described (as the B to A direction is similar). The cross-connect multiplexor 402*a* (X1) is selected as the way point for the point-to-point connection. Any cross-connect multiplexor 402 may be selected as a way point as long as there is an available path to the core multiplexors 104*a* (C1) and 104*b* (C4).

Available source line ports C1,*i* (core multiplexor 104*a*) and X1,*j* (core multiplexor 104*b*) are selected to create connections. Line port C1,*i* provides a connection from the core multiplexor 104*a* to the cross-connect multiplexor 402*a*, while line port X1,*j* provides a connection from cross-connect multiplexor 402*a* to the core multiplexor 104*b*. The edge Multiplexor 102*a* (E1) instead of tagging ingress frames with the source port identifier will tag ingress frames with the port identifier for line port C1,*i*—destination port identifier tagging).

As a result, ingress frames from customer A will egress on port C1,*i* of the core multiplexor 104*a*. The cross-connect multiplexor 402*a* (X1) instead of tagging ingress frames with the source port identifier will tag ingress frames with the port identifier for line port X1,*j*. The cross-connect multiplexor 402*a* (X1) is configured to loop back all frames at its uplink port. Therefore, the ingress frames from customer A will egress on port X1,*j* of the cross-connect multiplexor 402*a* (X1). The core multiplexor 104*b* (C4) instead of tagging ingress frames with the source port identifier will tag ingress frames with the port identifier for the line port leading to customer B, which completes the connection.

Additional multiplexors 404, 406, 408 are illustrated to provide connectivity and connections to one or more switches 410 for the provisioning of ELANs and for connections to a wide area network (WAN) (not shown). Point-to-point connections to the multiplexors 404, 406, 408 may be established in a similar manner.

The following example illustrates, in one embodiment, the number of customers that can be supported depending on the size and configuration of the soft cross-connect 400. With 3N multiplexors 102, 104, 402 (where N>1) each with L line ports, a given soft cross-connect can support LN customer line ports. Therefore, for N>1, each cross connect multiplexor in the soft cross-connect is operable to support L/3 customer ports. For example, with thirty-six (36), one hundred forty-four (144), or two hundred eighty-eight (288) (total) multiplexors each with ninety-six (96) 1GE line ports may provide cross-connect capability for 1152, 4608, and 9216 customer line ports, respectively.

Again referring to FIG. 5, a specific example of the operation of the network 100 (in the soft cross connect implementation) will now be described where a given customer desires LAN connectivity between point 112a and point 112b, as shown. As will be appreciated, the controller 406 includes mapping information to map or understand the current state of hardwire connections or link paths (i.e., which line ports or connected to which other line ports) between the core and cross-connect multiplexors 104, 402. For the specific example, we shall assume that point 112a is coupled to a specific first line port of the edge multiplexor 102a (E1) (identified hereafter as Port 1) while point 112b is coupled to a first line port of the edge multiplexor 102b (E4) (identified hereafter as Port 10), as generally determined by customer location(s). Given this initial configuration, when a determination is made to configure a communications path between the endpoints 112a and 112b, the controller 406 determines that the core multiplexors associated with multiplexors 102a (E1), 102b (E4) are the core multiplexors 104a (C1) and 104b (C4). Thus, the controller 406 needs to configure a path between the core multiplexors 104a (C1) and 104b (C4) via one of the cross connect multiplexors 402. At this time, numerous paths are possible.

The controller selects two paths—one path between the core multiplexor 104a (C1) and one of the cross connect multiplexors 404 and one path between the core multiplexor 104b (C4) and the same cross connect multiplexor—from the available paths. This selection may be based on various factors, including current state of available channels, bandwidth requirements, utilization rate of each cross connect multiplexor, etc., as desired. In this specific example, the controller 406 selects a certain path available between Port 3 of the core multiplexor 104a (C1) and Port 5 of the cross connect multiplexor 402a (X1) and a certain path available between Port 55 of the cross connect multiplexor 402a (X1) and the core multiplexor 104b (C4).

Upon selection of these links, the controller transmits data or messages to the edge, core and cross-connect multiplexors 102a, 102b, 104a, 104b, 402a to program the destination port tagging. The edge multiplexor 102a (E1) is instructed or programmed to tag frames received on Port 1 (ingress) with a Port 3 identifier. Additionally, the cross-connect multiplexor 402a (X1) and core multiplexor 104b (C4) are programmed to tag frames received on Port 5 (ingress) with a Port 55 identifier and frames received on Port 90 (ingress) with a Port 10 identifier, respectively. This configures the forward path from endpoint 102a to endpoint 102b. The reverse path is similarly programmed such that the edge multiplexor 102b (E4), cross-connect multiplexor 402a (X1) and core multiplexor 104a (C1) are programmed to tag frames received on Port 10 (ingress) with a Port 90 identifier, frames received on Port 55 (ingress) with a Port 5 identifier, and frames received on Port 3 (ingress) with a Port 1 identifier, respectively.

In operation, an Ethernet frame generated at endpoint 112a is received at Port 1 and the edge multiplexor 102a tags the frame with an identifier identifying Port 3. The tagged frame is multiplexed with frames received on other line ports of the multiplexor 102a and transmitted using one or more higher bandwidth channels over the DWDM network (which appropriately distinguishes the multiplexed frames of one edge multiplexor 102 from another).

The multiplexed frames (or signals) are received at a corresponding core multiplexor 104a (via a channel on the network 106 between the edge and core multiplexors 102a, 104a). In the embodiment shown, each edge multiplexor 102 has a corresponding core multiplexor 104 with one-to-one correspondence. Upon receipt, the multiplexed frames (or signals) are demultiplexed to recover the individual tagged frame (tagged with line Port 3 identifier). The core multiplexor 104a strips the tag and transmits this frame to its corresponding line Port 3 for transmission to the cross-connect multiplexor 402a for receipt on its ingress Port 5.

The cross-connect multiplexor 402a tags the frame received at its Port 5 with an identifier identifying Port 55. The cross-connect multiplexor 402a is configured to loop back at its uplink port (internally or externally). The cross connect multiplexor 402a strips the tag and transmits this frame to its corresponding line Port 55 for transmission to the core multiplexor 104b for receipt on its ingress Port 90.

This received frame is tagged by the core multiplexor 104b with an identifier identifying Port 10. The tagged frame is multiplexed with frames received on other line ports of the core multiplexor 104b and transmitted using one or more higher bandwidth channels over the DWDM network (which appropriately distinguishes the multiplexed frames of one core multiplexor 104 from another).

The multiplexed frames (or signals) are received at the corresponding edge multiplexor 102b (via a channel on the network 106 between the edge and core multiplexors 102b, 104b). Upon receipt, the multiplexed frames (or signals) are demultiplexed to recover the individual tagged frame (tagged with line Port 10 identifier). The edge multiplexor 102b strips the tag and transmits this frame to its corresponding line Port 10 for transmission on the line coupled to endpoint 112b. The reverse path is similar and will not be described.

The network configuration of the present invention provides the capability to have a plurality of private LAN lines (and LANs) embedded within the bandwidth of the network 100. Customers or subscribers simply see their private LAN line between points (point to point or multipoint connections). This allows for a service provider (or others) to implement more than one separate and private LAN communications line over a metro network.

In one specific embodiment of the present invention as described herein, the network 100 carries Ethernet packets or frames in accordance with Ethernet protocol. Other protocols may be used and the Ethernet packets from the customer endpoints 112 may be encapsulated in a data packet in accordance with a different protocol. Therefore, it will be understood that the concepts and teachings of the present invention, including the network 100 or the multiplexors 102, 104, may not be limited to Ethernet packets and protocol, and that any other suitable protocol and data packet format might be utilized including Internet Protocol ("IP") based packets, frame relay frames, Asynchronous Transfer Mode ("ATM") cells, or other data packets and protocols.

Figure 6:
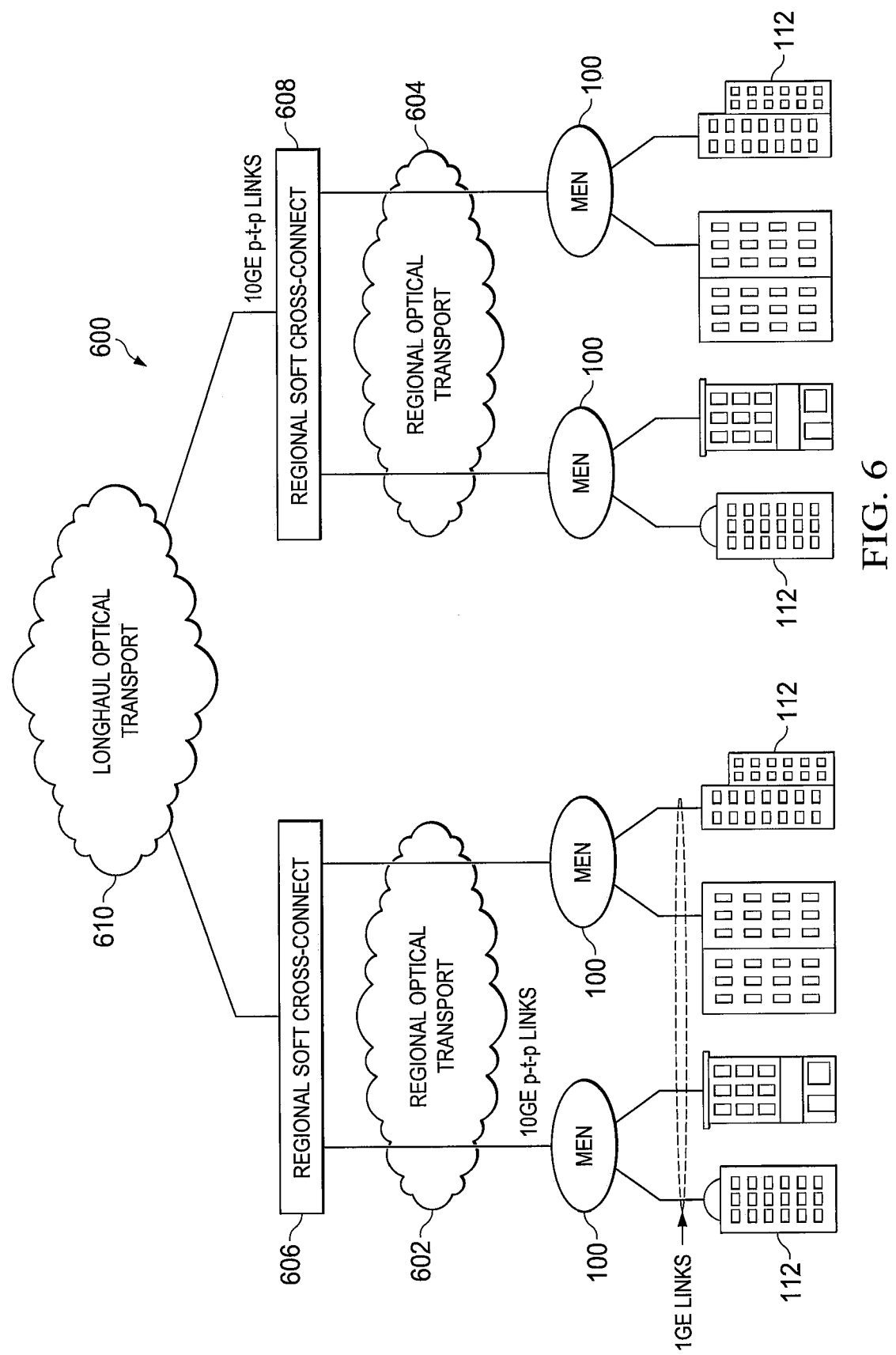
FIG. 6 is a block diagram of a larger wide area network implemented using the principles and technology described herein in accordance with the present invention.

Now turning to FIG. 6, there is illustrated a larger wide area network 600 implemented using the principles and technology described herein. It will be understood that a metro solution can be achieved with a single network 100, as depicted FIGS. 1-5. The wide area network 600 includes a plurality of metro networks 100 coupled to one or more regional optical transport systems 602, 604. Each transport system 602 is coupled to a regional cross-connect 606, 608 which in turn are coupled to a backbone longhaul optical transport system 610. In one embodiment, the networks 100 are connected to the regional optical transport systems via 10 GE point-to-point links, while the regional cross-connects 606, 608 are connected to the backbone optical transport system via similar 10 GE point-to-point links.

Regional cross-connects 606, 608 allow for on demand software configuration of point-to-point connections between networks 100 through the regional network 606, 608 and/or the longhaul network 610. Though a regional cross-connect 606, 608 may be implemented in a hardwired configuration, it will be more advantageous to implement or construct the regional cross-connects using cross-connect multiplexors (previously described herein in the soft cross connect implementation). As will be appreciated, the transport systems 602, 604, 610 are depicted as optical transport systems, but may be implemented wirelessly or using conventional wire transport, or any combination thereof.

Figure 7:
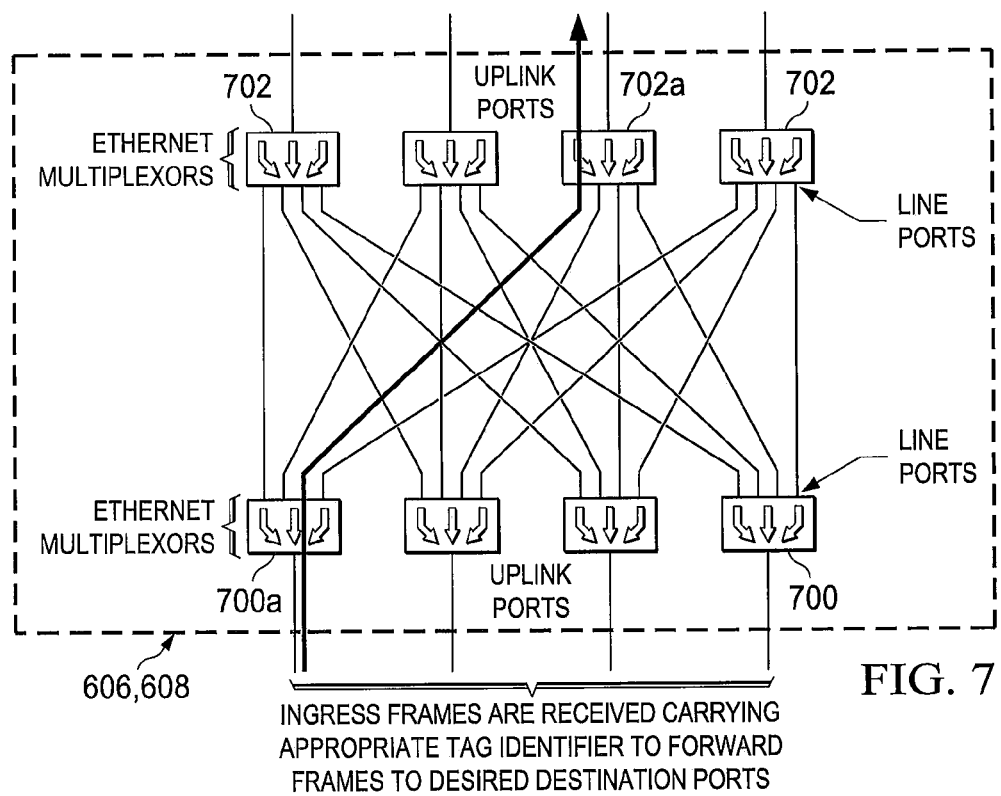
FIG. 7 depicts a regional soft cross connect apparatus in accordance with another embodiment.

Now referring to FIG. 7, there is illustrated a regional cross connect 606, 608 implemented as a soft cross-connect. The soft cross-connect 606, 608 is implemented using a plurality of cross-connect multiplexors 702 statically connected to the line ports of a plurality of core multiplexors 700, as shown. As will be appreciated, the multiplexors 700, 702 and configuration of the cross connect 606, 608 are the same or similar to the multiplexors and configuration as previously described herein and shown in FIG. 4. In a specific embodiment, each of the multiplexors 700, 702 have ninety-six (96) line ports, which allow each core multiplexor 700 to have twenty-four (24) line port connections to each cross-connect multiplexor 702. In one embodiment, each of the core multiplexors 700 are similarly or equally connected to all of the cross-connect multiplexors 702, and may be configured in a one-to-one correspondence where the number of cross-connect multiplexors 702 equals the number of core multiplexors 700. In other embodiments, cross connect multiplexors 702 may number fewer or more than the number of core multiplexors 700. It will be understood that the system of soft cross connects will operate the same or similar to that described with respect to FIGS. 4 and 5, and that the same or different controller apparatus will configure the communications paths and program the relevant multiplexors.

As illustrated, ingress frames received at one line port of the ingress core multiplexor 700a carry appropriate tag identifiers to forward the frames to the desired destination port(s) (of the cross-connect multiplexors 702, e.g., the egress multiplexor 702a)). The core multiplexor 700a uses destination port identifier tagging and works in conjunction with the cross-connect of the network 100 (see FIG. 5, uplink lines to WAN) to forward frames to the appropriate destination port within the soft cross-connect. The egress frames of the egress cross-connect multiplexor 702a are tagged with an appropriate tag identifier for next hop.

The above example illustrates the provisioning and connectivity of an ELINE between two points 112a, 112b for point-to-point connection for LAN-type operation. As will be appreciated, additional ELINES, ELANS or other connections/mapping may be formed, as desired, based on any suitable and desired sub-network or private network configuration.

The method of the present invention provides provisioning/connectivity for a number of separate LAN networks or services (such as ELINE, ELAN) within an overall transport network. This provides a service provider, or even a single customer, with a simple network architecture having flexibility and ability for provisioning separate LANs, as desired.

In some embodiments, all or some functions of the multiplexors and cross-connect device are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of communicating data packets over a LAN-based network, the method comprising:

receiving a first data packet from a first endpoint device at a first port of a first multiplexor;

tagging the received first data packet with a first identifier uniquely identifying the first port of the first device from other ports of the first device;

multiplexing the tagged data packet with other tagged data packets received at other ports of the first device to generate multiplexed data and outputting the multiplexed data at a first uplink port of the first device and transporting the multiplexed data over a communications channel to an uplink port of a second device;

demultiplexing the multiplexed data received via the uplink port to recover the first tagged data packet and the other tagged data packets;

removing the first identifier from the first tagged data packet and transmitting the first data packet out a second port of the second device, the first identifier operable for uniquely identifying the second port from other ports of the second device;

receiving, via a cross-connect device, the untagged first data packet from the second port at a third device;

tagging, at the third device, the received untagged first data packet with a second identifier uniquely identifying a third port of the third device from other ports of the third device; and forwarding the tagged first data packet with the second identifier toward a destination point.

2. The method of communicating data packets over a LAN-based network as claimed in claim 1, wherein tagging the received first data packet with a first identifier uniquely identifying the first port of the first device from other ports of the first device comprises:
   tagging the received first data packet with a predetermined destination port identifier.

3. The method of communicating data packets over a LAN-based network as claimed in claim 1, wherein the identifiers identify next hop destination egress ports.

4. A method of configuring communication links between two or more endpoints in a network, the network comprising a plurality of edge multiplexors each communicatively coupled to a corresponding plurality of core multiplexors, and a cross-connect multiplexor communicatively coupled to the plurality of core multiplexors, the method comprising:
   receiving a request to configure a communications path between a first endpoint and a second endpoint;
   selecting and identifying an available link between the cross connect multiplexor and a first one of the plurality of core multiplexors;
   transmitting programming information to a first edge multiplexor corresponding to the first endpoint, the programming information operable for instructing the first edge multiplexor to tag frames received from the first endpoint with an identifier identifying a first attribute of the selected available link;
   transmitting programming information to the cross connect multiplexor, the programming information operable for instructing the cross connect multiplexor to tag frames received via the first edge multiplexor with an identifier identifying a second attribute of the selected available link; and
   transmitting programming information to a first one of the plurality of core multiplexors corresponding to the second endpoint, the programming information operable for instructing the first core multiplexor to tag frames received from the cross connect multiplexor with an identifier identifying an attribute of the second endpoint.

5. The method in accordance with claim 4 wherein the identifiers identify next hop destination egress ports.

6. The method of configuring communication links between two or more endpoints in a network as claimed in claim 4, wherein the cross connect multiplexor is coupled to at least a first port and a second port of the plurality of ports of the core multiplexors providing a communications path between the first port and the second port thereby providing a point to point link between a first port and a second port of the plurality of ports of the edge multiplexors.

7. The method of configuring communication links between two or more endpoints in a network as claimed in claim 6, wherein the cross connect multiplexor is implemented in a one of: a hard cross connection implementation and a soft cross connect implementation.

8. A switching device operable in a packet-based network, the switching device comprising:
   a first multiplexor having an uplink port and a plurality of line ports, the first multiplexor operable for receiving data packets at the plurality of line ports of the first multiplexor, tagging the received data packets with an identifier uniquely identifying the line port receiving the data packet, multiplexing the tagged and received data packets into multiplexed data, and transmitting the multiplexed data on the uplink port;
   a second multiplexor having an uplink port and a plurality of line ports, the second multiplexor operable for receiving data packets at the plurality of line ports of the second multiplexor, tagging the received data packets with an identifier uniquely identifying the line port receiving the data packet, multiplexing the tagged and received data packets into multiplexed data, and transmitting the multiplexed data on the uplink port of the second multiplexor;
   a cross-connect device having a first terminal connected to a first one of the plurality of line ports of the first multiplexor and a second terminal connected to a first one of the plurality of line ports of the second multiplexor, the cross-connect structured to provide a communications path between the first terminal and the second terminal thereby providing a communications path between the first line port of the first multiplexor and the first line port of the second multiplexor; and
   wherein the cross-connect device of the switching device receives an untagged first data packet from a second port at a third device and tags, at the third device, the received untagged first data packet with a second identifier uniquely identifying a third port of the third device from other ports of the third device, and forwards the tagged first data packet with the second identifier toward a destination point.

9. A switching device operable in a packet-based network, the switching device comprising:
   a first multiplexor having an uplink port and a plurality of line ports, the first multiplexor operable for receiving data packets at the plurality of line ports of the first multiplexor, tagging the received data packets with an identifier uniquely identifying the line port receiving the data packet, multiplexing the tagged and received data packets into multiplexed data, and transmitting the multiplexed data on the uplink port;
   a second multiplexor having an uplink port and a plurality of line ports, the second multiplexor operable for receiving data packets at the plurality of line ports of the second multiplexor, tagging the received data packets with an identifier uniquely identifying the line port receiving the data packet, multiplexing the tagged and received data packets into multiplexed data, and transmitting the multiplexed data on the uplink port of the second multiplexor;
   a cross-connect device having a first terminal connected to a first one of the plurality of line ports of the first multiplexor and a second terminal connected to a first one of the plurality of line ports of the second multiplexor, the cross-connect structured to provide a communications path between the first terminal and the second terminal thereby providing a communications path between the first line port of the first multiplexor and the first line port of the second multiplexor; and
   wherein the identifiers identify next hop destination egress ports.

10. A metro area communications network comprising:
   a plurality of edge multiplexors, each edge multiplexor having a plurality of line ports operable for coupling to a plurality of end devices and an uplink port;
   a transport network coupled to each of the uplink ports and operable for carrying data packets generated by the plurality of end devices;
   a plurality of core multiplexors, each one of the plurality of core multiplexors having a one-to-one line port correspondence with a corresponding one of the plurality of edge multiplexors, each core multiplexor having a plurality of line ports and an uplink port, the uplink port coupled to the transport network;

a cross connect device coupled to at least a first port and a second port of the plurality of ports of the core multiplexors providing a communications path between the first port and the second port thereby providing a point to point link between a first port and a second port of the plurality of ports of the edge multiplexors; and wherein the cross-connect device of the switching device receives an untagged first data packet from a second port at a third device and tags, at the third device, the received untagged first data packet with a second identifier uniquely identifying a third port of the third device from other ports of the third device, and forwards the tagged first data packet with the second identifier toward a destination point.

11. The metro area communications network as claimed in claim 10 wherein the identifiers identify next hop destination egress ports.

* * * * *